Figure 1:
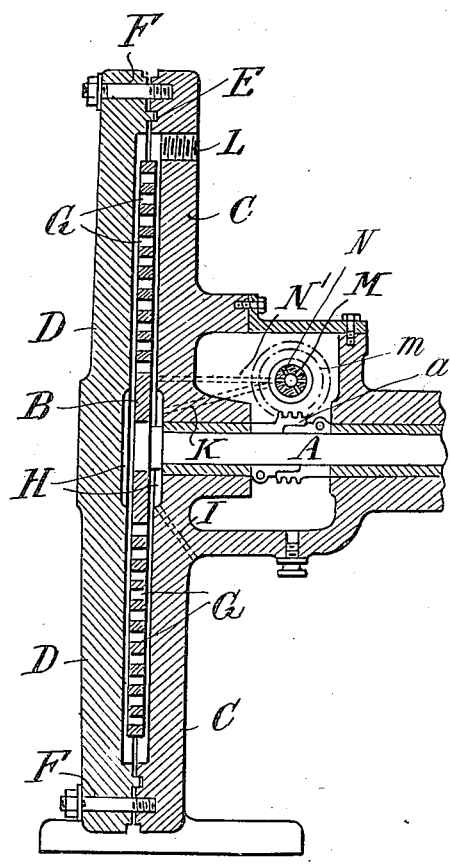

S. H. BLICHFELDT.
PRODUCTION OF EMULSIONS.
APPLICATION FILED AUG. 25, 1914.

1,192,492.

Patented July 25, 1916.
3 SHEETS—SHEET 1.

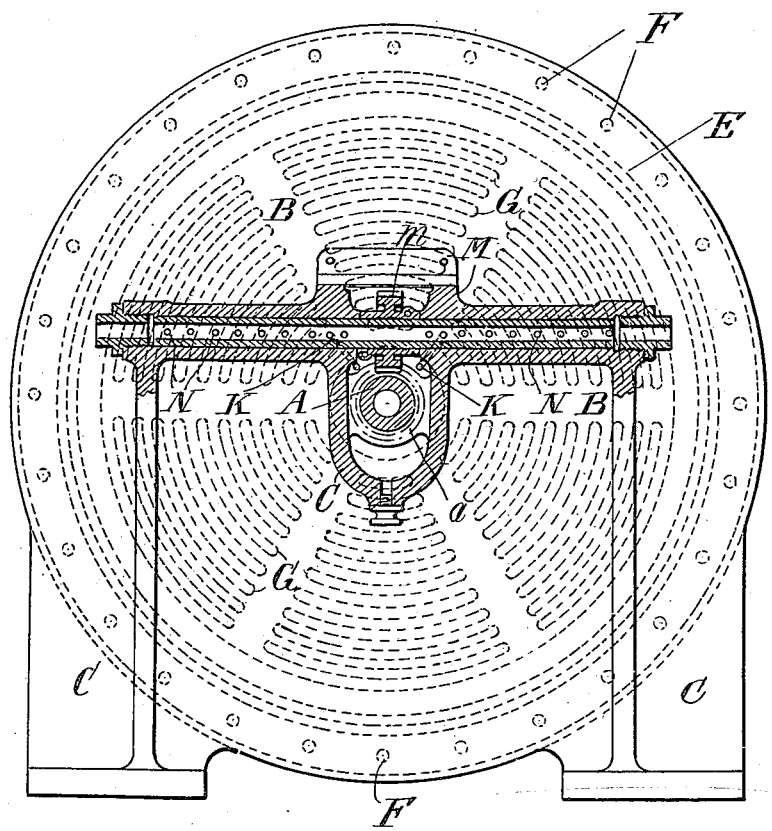

S. H. BLICHFELDT.
PRODUCTION OF EMULSIONS.
APPLICATION FILED AUG. 25, 1914.
1,192,492.
Patented July 25, 1916.
3 SHEETS—SHEET 3.
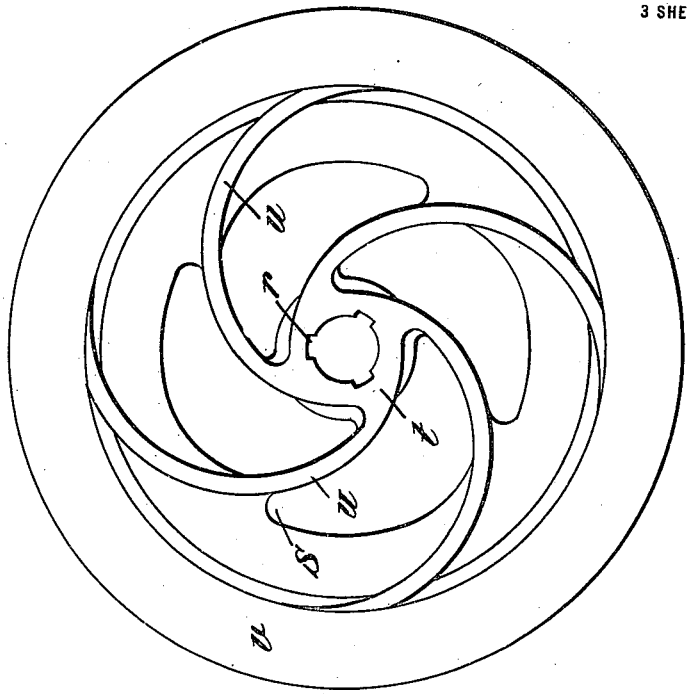
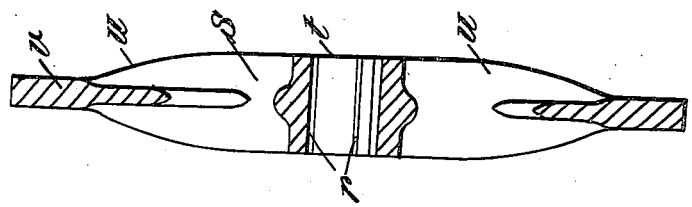
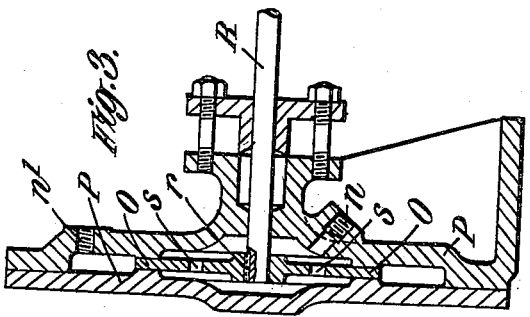
Witnesses:
Inventor:
Søren Høy Blichfeldt,

UNITED STATES PATENT OFFICE.

SÖREN HÖY BLICHFELDT, OF SOUTHALL, ENGLAND, ASSIGNOR TO FLAKES A./S., OF COPENHAGEN, DENMARK.

PRODUCTION OF EMULSIONS.

1,192,492.  Specification of Letters Patent.  Patented July 25, 1916.

Application filed August 25, 1914. Serial No. 858,505.

*To all whom it may concern:*

Be it known that I, SÖREN HÖY BLICHFELDT, a subject of the King of Denmark, residing at Merston House, Southall, in the county of Middlesex, England, have invented certain new and useful Improvements in or Relating to the Production of Emulsions, of which the following is a specification.

This invention relates to an improved process and improved apparatus for the production of emulsions, such for example as are involved in the manufacture of margarin and like fatty food stuffs or other materials.

The improved process consists in passing the liquid in an unbroken stream through a continuous narrow channel formed between relatively moving walls, such as are formed, for example, by a rotating disk within a casing, and in adding one ingredient of the emulsion at successive stages in the said channel between the inlet and outlet.

In the improved apparatus the ingredients are supplied to both sides of a member of disk, plate, cylinder, cone or other suitable form, mounted in a single casing between surfaces which approach very closely to that of the said member, so that the pressures are balanced on opposite sides of the latter and the thrust is taken off the moving parts of the machine.

A convenient construction of apparatus according to my invention comprises a disk mounted upon a shaft and adapted to turn inside a fixed disk shaped casing, to the center of which one ingredient of the emulsion is supplied so as to pass from the center to the circumference of the apparatus. The other ingredient (usually the fatty one) may enter intermittently through a tube extending transversely across the casing and communicating with the interior of the casing through various small passages at different distances from the axis. I may make the disk with a number of slots or channels, preferably of concentric circular segmental form, which slots afford free communication between the two sides of the disk. The central disk may however be made without slots and the ingredients supplied under equal pressures to each side.

I have found it desirable to mount the disk so that it is free to move axially and therefore to float within its casing between fixed emulsifying surfaces. Owing to the layer of liquid continuously flowing between the closely adjacent disk and casing surface, the disk automatically adjusts itself without coming into contact with the casing and thus renders unnecessary the very accurate adjustment of all the parts which would be required with a rigidly mounted disk. I may make the surfaces of the disk flat or may make the disk slightly convex or of any other cross section found desirable. To adjust the space between the disk and casing surfaces accurately and with facility I propose to divide the casing into two disks or plates with meeting flanges at their outer edges, between which flanges is placed a soft washer. Tightening bolts around the circumference enable the pressure on the washer to be varied and thus give the minute adjustment necessary to vary the volume between the emulsifying surfaces. The distance between the surfaces is usually of the order of 10 to 100μ so that great accuracy is desirable in the adjustment of the casing volume, which can be varied without opening the casing or otherwise interfering with the apparatus while running.

In order that the said invention may be clearly understood and readily carried into effect, I will now proceed to describe the same more fully with reference to the accompanying drawing, in which:—

Figure 1 is a section taken along the axis of a single disk machine embodying my invention. Fig. 2 is a section through the intermittent supply device with the emulsifier casing in elevation. Fig. 3 shows in section a disk apparatus especially intended for use in homogenizing an emulsion, and Figs. 4 and 5 show in elevation and cross section respectively a modification of the homogenizing disk member having the form of a centrifugal propeller wheel.

The disk B is, in the apparatus illustrated in Figs. 1 and 2, provided with a large number of concentric slots G, six radial groups of such slots being shown. These slots extend through the disk so that the very narrow spaces between the casing halves C and D and disks B on each side of the latter are in open communication and there is no chance of excess pressure accumulating on either side, the disk being therefore balanced. The disk is preferably mounted loosely on the end of the shaft A so that although driven by the shaft it is free to adjust itself axially, forming a floating disk kept from contact with the casing by the layer of liquid between the surfaces. The thickness of the emulsifying layers between the disk and casing can be adjusted easily and accurately during the running of the machine by tightening or loosening the bolts F, the packing or washer E between the two members C and D of the casing being sufficiently yielding to allow of the minute adjustments required.

The tube M through which the fatty ingredient is supplied intermittently is driven from the shaft A by the worm a and worm wheel m at such a speed that the registering of the holes N with the passages or perforations N' in the casing member C occurs while the slots G are passing the ends of these passages, which are together with the holes N spaced to correspond with the slots, as indicated in Fig. 2. The watery ingredient is supplied to the cavity H at the center of the casing through the inlet I so that this ingredient travels outwardly to the periphery of the casing while it is progressively enriched by the additions of the fatty material at successive points. The resulting emulsion escapes through the outlet L at the periphery of the casing. A small quantity of the fatty material may be led to the central cavity H through the auxiliary passages K in the casing member C.

The holes N and passages N' are preferably arranged so that the intermittent supply occurs at different times for different distances from the axis of the emulsifying disk. While the disk B is shown as a flat slotted disk the slots may be omitted if the watery constituent is admitted to the cavity H at each side of the disk. Any suitable convex or other shape may also be given to the disk faces and inner surface of the casing.

In the modification illustrated in Fig. 3, which shows the balanced disk device applied to the homogenizing of an emulsion already partly made but not in the final condition required, a disk O is mounted on the shaft R in the casing P having an inlet n for the unhomogenized material and an outlet n' at the periphery for the homogenized emulsion. The homogenizing action occurs in the narrow annular channels between the disk O and casing P on each side of the disk. The disk O floats between the two sides of the casing as in the previously described construction, having axial freedom on the feather r connecting the disk to the shaft R. Holes s in the disk O allow the emulsion to reach both sides of the disk so that the pressure on each side is balanced. The disk is rapidly rotated and the emulsion is forced between the disk and the casing P, the ingredients of the emulsion being thus finely divided on their way to the outlet n' so as to bring about the desired homogenizing effect.

The homogenizing disk member may be in the form illustrated in Figs. 4 and 5, which show it as a bucket wheel S having a hub t with grooves r receiving the shaft keys and allowing of axial displacement of the wheel as already described in connection with the disk O. The rim v forms the homogenizing surfaces and is carried on the hub by means of the curved arms or blades u, which leave open passages between them to allow free access of liquid to both sides of the wheel. The blades u on rotation of the wheel act as centrifugal members and drive the emulsion with increased velocity and pressure through the homogenizing channels.

What I claim and desire to secure by Letters Patent of the United States is:—

1. A process for the production of emulsions consisting in passing one ingredient of the emulsion in a continuous stream from the center to the circumference of a narrow channel formed between two disk surfaces having relative rotation and in adding the second ingredient to the said channel at successive stages from the center, while the emulsion so produced escapes at the circumference.

2. In emulsifying apparatus, a casing, a rotatory disk forming with the casing an emulsifying channel at each side, means for supplying the ingredients of the emulsion to both sides of the disk and means for supplying one ingredient at successive stages from the inner to the outer edge of the emulsifying channel.

3. In emulsifying apparatus, a casing and an emulsifying disk within the casing having openings which admit of the free passage of the liquid from one side of the disk to the other.

4. In emulsifying apparatus, a casing of disk type, a driving shaft, an emulsifying member of disk type within the casing, mounted on the said shaft so as to turn with it while otherwise free to adjust itself thereon, and means for supplying the ingredients of the emulsion to both sides of the said member.

5. In emulsifying apparatus, a disk shaped casing having an outlet toward the periphery, an emulsifying rotatory member of disk type in the said casing, means for admitting one ingredient of the emulsion to the middle of the casing and means for admitting the second ingredient at a number of points at different distances from the center.

6. In emulsifying apparatus, a disk-shaped casing having an outlet toward the periphery, an emulsifying rotatory member of disk type in the said casing, means for admitting one ingredient of the emulsion to the middle of the casing and a rotatory perforated tube extending transversely across the said casing and admitting the second ingredient at different points from the center.

7. In emulsifying apparatus, a disk shaped casing provided with an outlet toward the periphery, an inlet toward the center for one ingredient of the emulsion and a transverse series of perforations for admitting the second ingredient, a rotatory emulsifying member within the casing, and a rotatory perforated tube supplying the second ingredient, the perforations of the tube and the casing registering intermittently and being so related that the admission of the second ingredient occurs at different intervals for different distances from the center of the casing.

8. In emulsifying apparatus, a disk shaped casing provided with an outlet toward the periphery, an inlet toward the center for one ingredient of the emulsion and a transverse series of perforations for admitting the second ingredient, a rotatory emulsifying disk formed with a series of concentric slots registering with the said casing perforations, and a rotatory perforating tube supplying the second ingredient.

9. In emulsifying apparatus, a disk shaped casing having an outlet toward the periphery, an inlet toward the center for one ingredient and a transverse series of perforations for the second ingredient, an emulsifying disk, a shaft driving the said disk, a perforated transverse tube supplying the second ingredient through the said casing perforations and gearing from the said shaft to the tube adapted to rotate the latter in predetermined ratio to the rotation of the disk.

In testimony whereof I affix my signature in presence of two witnesses.

SÖREN HÖY BLICHFELDT.

Witnesses:
T. SELBY WARDE,
WALTER J. SKERTEN.